LIGHT MODULE AND COMBINATION THEREOF WITH PUSH BUTTON OPERATOR AND SWITCH

Original Filed Nov. 8, 1965 4 Sheets-Sheet 1

INVENTORS
Richard C. Rothweiler,
Josef Bienenfeld &
Carl B. Sohns,
by John H. Leonard,
their ATTORNEY.

INVENTORS.
Richard C. Rothweiler,
Joseph Berenfeld &
Carl B. Sohns,
by John H. Leonard,
their ATTORNEY.

INVENTORS.
Richard C. Rothweiler,
Joseph Berenfeld,
Carl B. Solms,
by: John A. Fraser,
Their ATTORNEY.

INVENTORS
Richard C. Rothweiler,
Josef Bierenfeld &
Carl B. Solms,
by Johnston Lennard,
their ATTORNEY.

United States Patent Office

Re. 27,178
Reissued Sept. 21, 1971

27,178

LIGHT MODULE AND COMBINATION THEREOF WITH PUSH BUTTON OPERATOR AND SWITCH

Richard C. Rothweiler, Asheville, N.C., and Josef Bierenfeld, Shorewood, and Carl B. Sohns, Whitefish Bay, Wis., assignors to Square D Company, Park Ridge, Ill.

Original No. 3,315,060, dated Apr. 18, 1967, Ser. No. 506,696, Nov. 8, 1965. Application for reissue Feb. 19, 1970, Ser. No. 12,872

Int. Cl. H01h *9/18*

U.S. Cl. 200—167A 8 Claims

Matter enclosed in heavy brackets [ ] appears in the original patent but forms no part of this reissue specification; matter printed in italics indicates the additions made by reissue.

*ABSTRACT OF THE DISCLOSURE*

*A light module for an illuminated pushbutton type electrical switching unit. The module is arranged to be mounted between an illuminated pushbutton type operator and one or more switch units and includes passages which receive pins to transmit movements of the operator to the switches and an internal cavity which receives a transformer or resistors so that the voltage of the supply for the switching unit is made compatible with the requirements of the lamp which is positioned by the module to illuminate the bushbutton.*

This invention relates to light modules and to assemblies thereof with push button operators and contact switches having push buttons to be operated by the operator.

The module is [cone] *one* that can be used in connection with a large number of types of push button operators, such as illuminated push button operators, push-to-test operators, selector switch pilot lights, and the like.

The module is one wherein, without change in the exterior shape of the module and in the manner of mounting it in the assembly, internal circuitry may be provided for supplying voltage, from a source directly, or through resistors, or by means of a transformer.

The module carries actuating pins extending endwise entirely through the module body and movable endwise so that, when the module is assembled between an operator and pair of push button switches, the pins can be moved endwise by the operator and thereby engage and operate the push buttons of the associated switches.

Very specific features are the nature of the actuating pins and their installation in the module by snap-fastening, the connecting means on the cover for connecting it on the module and for cooperating in connecting the module in a switch and operator assembly. And the pin connections between the internal conductors and external terminal elements of the module such that the elements can readily be installed and secured in installed positions by the pins without soldering.

Various other objects and advantages will become apparent from the following description wherein reference is made to the drawings in which.

Figure 2:
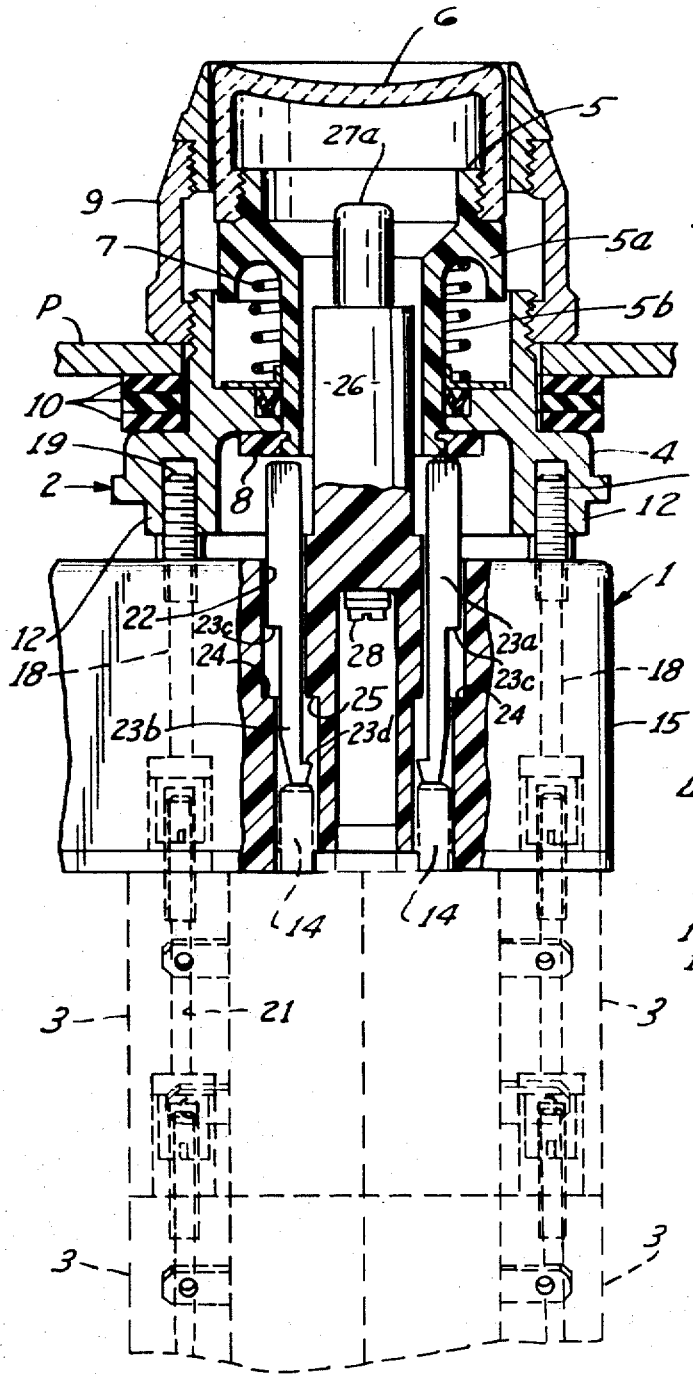
FIG. 2 is an enlarged front elevation of the structure illustrated in FIG. 1, part thereof being shown in section.
Figure 1:
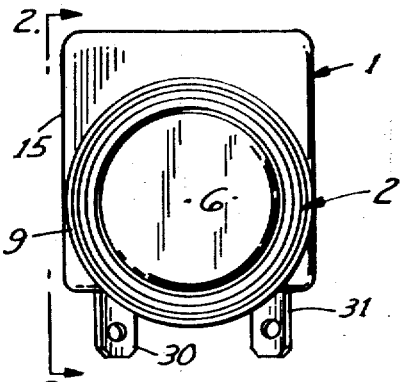
FIG. 1 is a top plan view of a preferred form of light module embodying the present invention, showing the module connected with an illuminated push button operator and a plurality of push button operated contact blocks or switches.
Figure 3:
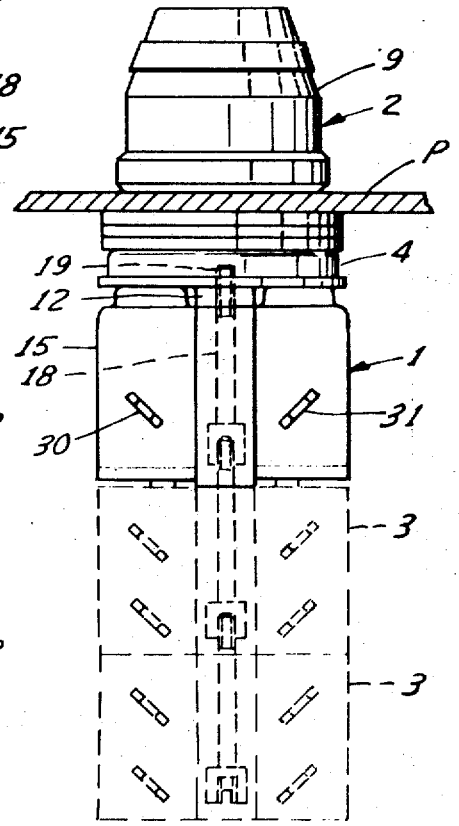
FIG. 3 is a right side elevation of the structure illustrated in FIG. 1.
Figure 4:
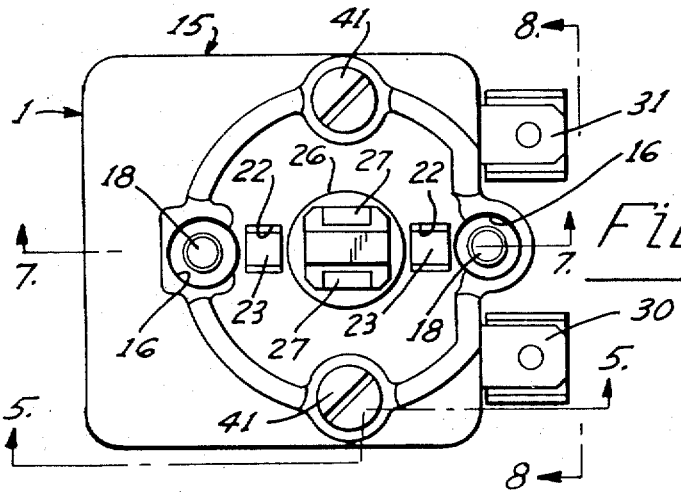
FIG. 4 is an enlarged top plan view of a form of the light module arranged for employing resistors and a neon light bulb.
Figure 5:
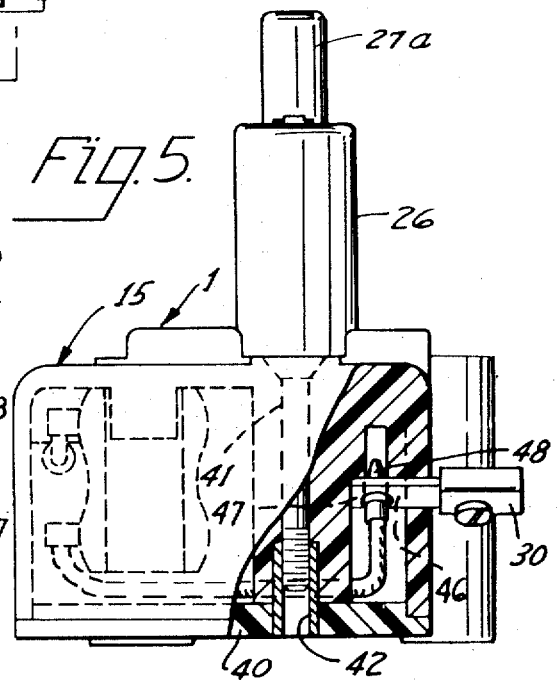
FIG. 5 is a front elevation of the module shown in FIG. 4, part thereof being shown in section as indicated by the line 5—5 in FIGS. 4 and 6.

Referring to the drawings, the light module 1 is shown in an assembly wherein it is connected at its forward end to a push button operator 2 and at its other end to a pair of push button operated contact blocks 3 arranged side by side.

The push button operator 2 may be one of a number of types, such as an illuminated operator, a push-to-test operator, an illuminated selector switch, and the like. In the form shown herein for purposes of illustration, it is an illuminated push button operator. This operator 2 comprises a base 4 on which is supported a push button actuator 5 having a head 5a, a stem 5b, and an axial passage extending entirely therethrough. At its forward end the head 5a carries a lens 6. The stems 5b is urged forwardly by a return spring 7, the forward movement being restrained by a locking ring 8. A ring nut 9 is employed for clamping the operator base 4 to a panel P with the head 5a exposed forwardly of the panel. Gaskets 10 may be interposed between the panel and an external shoulder on the base 4 [, and between the panel and ring nut 9.]. The base 4 has suitable rearwardly projecting bosses 12 which are adapted to engage the forward end of the body of the light module for supporting the module 1 on, and in operating position with respect to the operator 2.

The contact blocks 3 are connected to the opposite end of the module 1, as will later be explained, and have the usual make and break contacts operable by operating push buttons 14 which extend forwardly of the blocks therefrom and are arranged to be operated by the push button operator 2 through actuating means carried by the module.

Figure 7:
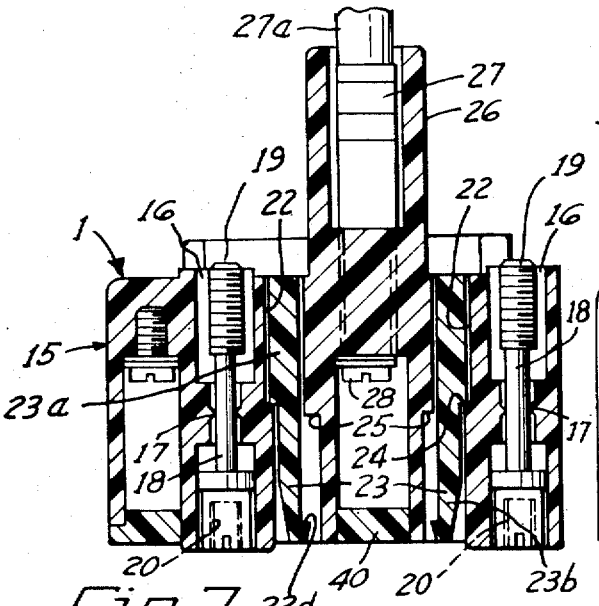
FIG. 7 is a vertical sectional view of the module illustrated in FIG. 4 and is taken on the line 7—7 thereof.

As best illustrated in FIGS. 4 through 8, the module comprises a body 15 of molded synthetic plastic such, for example, as Durez, which is an electrical insulator. The body 15 has two through bores 16, each having a restricted central portion with an internal bead 17 therein, as best illustrated in FIG. 7. Mounted in the bores, respectively, are mounting bolts 18, each having at its forward end suitable threaded shanks 19 and at its opposite end an internally threaded head 20. The bores 16 are arranged for alignment with the internally threaded bosses 12, respectively, of the operator base 4, and the shanks .9 are in threaded engagement with their associated bosses 2, and thereby secure the module 1 to the operator 2. The bolts may be forced shank end foremost past the ibs 17 which then restore themselves sufficiently to reain the bolts 18 in the bores 16.

The contact blocks 3 are preferably of the type decribed in the co-pending application of Turnbull, Bierenld, and Sohns, Ser. No. 453,410, filed May 5, 1965, ntitled, Push Button Operated Switch Structure. Such locks have through passages 21 aligned with the bores .6 of the module. The passages in the blocks 3 accomnodate bolts, such as duplicates of the bolts 18, of vhich the externally threaded shanks are in threaded engagement with internally threaded ends 20 of the bolts 18 of the module, and of which the heads can receive the hanks of additional contact blocks 3 arranged in end o end relation, if desired.

With this arrangement the forward end of the module body 15 can be drawn fixedly against the rear of the operator, and a pair of contact blocks can be arranged side by side and drawn firmly against the rear face of the body 15. Successive pairs of blocks may be connected, in urn, in a row extending endwise of their push buttons.

The body 15 is provided with through passages 22 vhich are so positioned that when the operator 2, module 1, and contact blocks 3 are connected together, the pasages 22 are aligned with the push buttons 14, respecively, of the contact blocks.

It is desirable that the push buttons 14 be operated by he actuator 5 of the operator. For this purpose, suitable motion transmitting means, such as pins 23, are disposed in the passages 22, respectively. The rear portions of the passages 22 are aligned with the push buttons 14 and are offset partially with respect to the forward portions of the passages 22 so that resultant shoulders 24 and 25 are provided in each passage 22. Each of the pins 23 has a forward portion 23a slidable endwise in he forward portion of the associated passage 22 with operating clearance, and a rear portion 23b of smaller cross-section than the portion 23a, thus providing a shoulder 23c on the pin between the portions 23a and 23b. The lower end of the portion 23b carries an upwardly facing shoulder 23d. The shoulder 23c is adapted o seat on the shoulder 24 of the passage 22 to prevent novement of the pin 23 rearwardly beyond a predetermined starting position. The shoulder 23d is adapted to seat against the shoulder 25 to prevent removal of the pin 23 forwardly out of the associated passage 22. The pins 23 are preferably made of synthetic organic plastic, such as Zytel, which is relatively rigid, yet flexible and resilient, so that the pins can be installed in the passages 22 by forcing them thereinto rear end foremost from the forward end of the passages 22. During installation, the rear portions 23b are resiliently deflected transversely of the passages as they pass the shoulders 24 so as to permit the forward portions 23b to align with the forward ends of the passages 22, then self-restore themselves to align the shoulders 23d and 25 for preventing removal of the pins 23 forwardly.

The pins 23 are of the same length as the length of the nodule body 15. When the push buttons 14 are in their fully extended positions, as illustrated, they extend into the passages 22 and move the pins 23 forwardly so that the forward ends of the pins 23 are substantially at the position for contact with the inner end of the actuator stem 5b locking ring 8. This relation is such that the forward ends of the pins 23 occupy the same position as would the forward ends of the push buttons 14 were the blocks 3 connected to the operator without the interposition of the module.

Thus upon depression of the actuator 5, the movement thereof is transferred by the pins 23 to the push buttons 14, respectively.

The module body 15 has a forwardly extending neck portion 26 which is adapted to receive a shank of a suitable light bulb 27a. Bulb engaging contacts 27 are mounted in the *body* [base] 15 and have portions disposed in the interior of the *body* [base] adapted to receive screws 28 for securing conductors and the like to their inner ends. The forward ends of the contacts 27 are arranged to engage the terminals of the bulb 27a, respectively. The form illustrated is for a generally rectangular shank having contacts at its opposite side complementary to the contacts 27, respectively.

The push button operator, whether of the illuminated type, push-to-test type, rotary selector type, or the like, is hollow and accommodates a portion of the neck portion 26 with operating clearance, the neck portion 26 being of such length that when the module is installed on the rear of the operator body 4, the outer end of the bulb is in a position to effectively illuminate the lens 6.

As heretofore mentioned, the light bulb may be of a type to be connected directly across the power line connected to the switches, or it may be one in which one or more resistors are required between the power source and the bulb. Again, it may be of the type wherein a transformer is interposed between the power source and the bulb.

The present module is one of which the body, without change in exterior shape and side, is adapted to be arranged for containing any one of these circuits. The body is provided with external terminals 30 and 31 which are for connection of the module to a power source. In the form of the module illustrated in FIGS. 4 through 7, resistors are to be interposed between the contacts 27 and the terminals 30 and 31, respectively. For this purpose, a screw type connector 32 is mounted in the body 15. A conductor 33 leads from the terminal 30 to the connector 32. One terminal of a resistor 35 is connected to the conductor 33 by the connector 32. The opposite terminal of the resistor 35 is connected to one of the contacts 27 by one of the screws 28. The other *screw* [conductor] 28 is connected by a conductor 36 with the terminal 31. An additional resistor 38 may be connected across the terminals *30 and 31* [27] by the screws 28. Thus the resistor 35 is connected in series with terminals 30 and 31, and the other resistor 38 is connected in parallel with the *contacts.* [terminals] These resistors, when secured in the circuit may be tucked down into the hollow interior of the body 15, and so remain. If desired, the resistor 38 may be omitted. When the internal circuit is connected to the contacts 27 and to the terminals 30 and 31, a cover 40 is applied to close the open rear end of the body 15. The cover 40 is secured in place by suitable bolts 41 extending through bores in the body 15 and in threaded engagement with bushings 42, respectively, carried by the cover 40.

Figure 6:
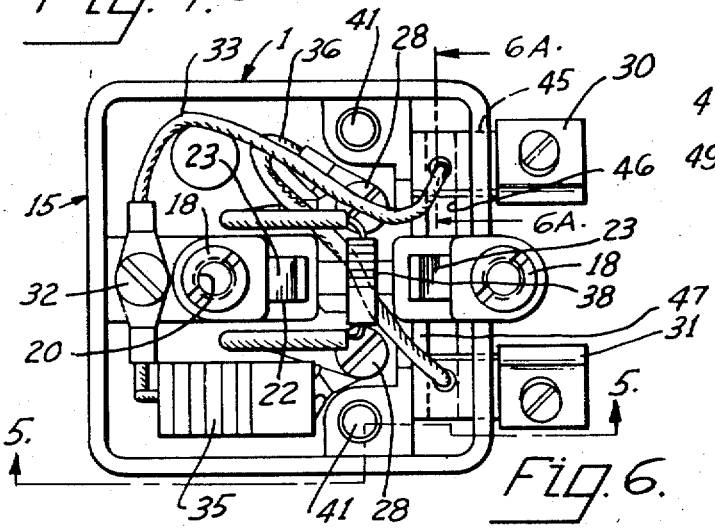
FIG. 6 is a bottom plan view of the module illustrated in FIG. 4.
Figure 6A:
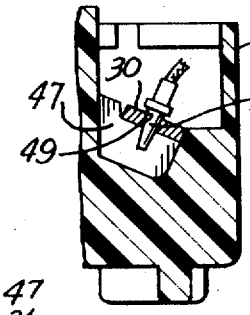
FIG. 6A is a fragmentary sectional view taken on the line 6A—6A of FIG. 6, showing the interconnection between an external terminal of the module and one of the internal conductors of the module.
Figure 8:
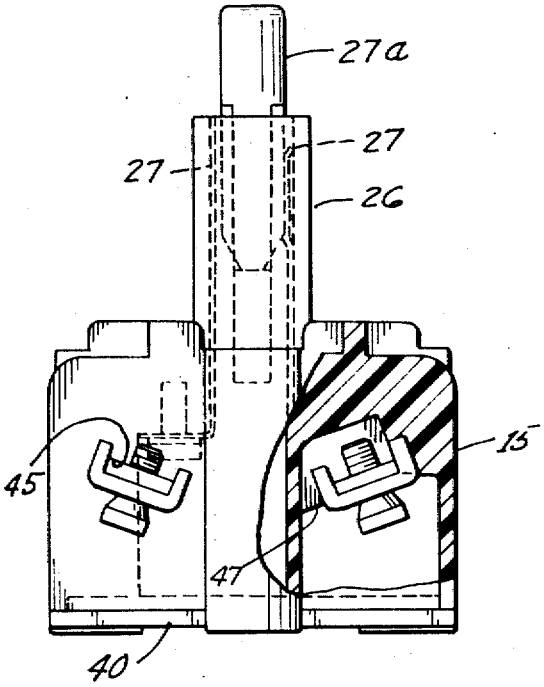
FIG. 8 is a right side elevation of the module shown in FIGS. 4 through 7, part thereof being shown in section.

In order to hold the terminals 30 and 31 in position, the outer wall of the body 15 is provided with laterally extending passages or slots 45 which lie in planes slightly oblique to the fore and aft dimension of the base and divergent rearwardly of the body 15. Within the body 15 are suitable ledges 46 and 47 which are spaced apart end wise of the slots 45. The inner ends of the terminals 30 and 31 rest on these ledges. For example, the terminal 30 extends through its passage 45 and rests on the top of the ledges 46 and 47. The conductors associated with the terminals 30 and 31 are provided at their outer ends, as best illustrated in FIG. 6a, with tapered pins 48, respectively. The terminals are essentially the same so that only the terminal 30 is described in detail. It is provided with an aperture 49 positioned to overlie the space between the two ledges 46 and 47. The tapered pin 48 of its conductor is inserted through the apertures 49 and extends therebeyond into the space between the ridges 46 and 47. Thus, for assembling the terminals, all that is necessary is to insert them through associated slot 45 until their inner end portions are seated on the ridges 46 and 47, and thereupon insert pins 48 on ends of their associated conductors, thereby anchoring the terminals against withdrawal outwardly from the body 15.

Figure 9:
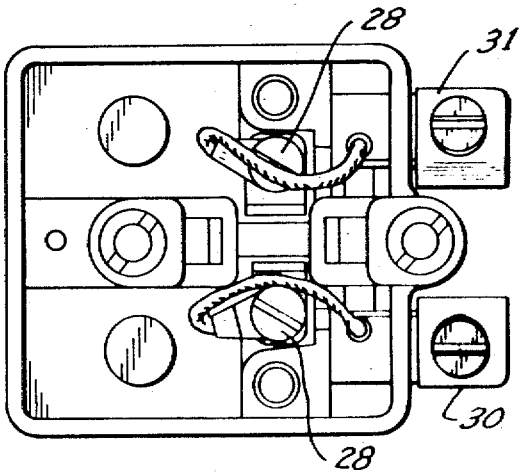
FIG. 9 is a bottom plan view of a module such as illustrated in FIGS. 4 through 7, but showing its modified circuitry for direct connection to a voltage source associated with the module.
Figure 10:
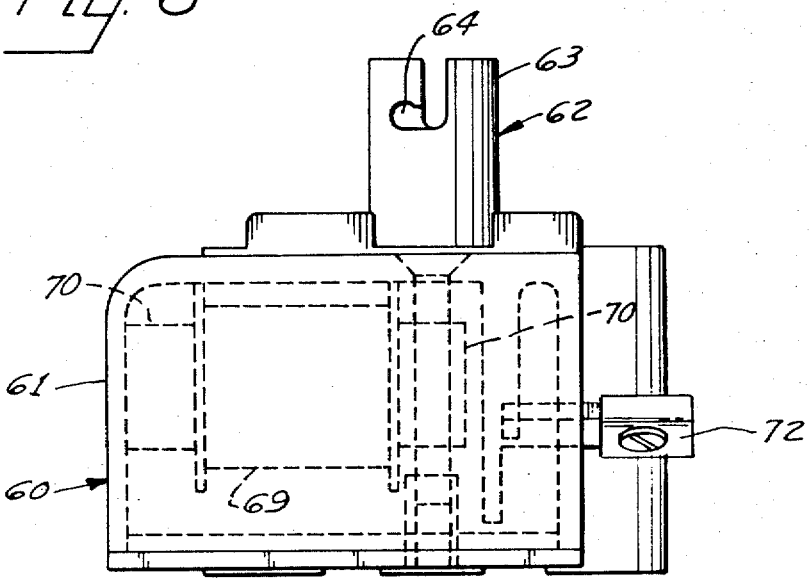
FIG. 10 is a front elevation, similar to FIG. 5, showing a modification of the module wherein a transformer assembly is employed for operation of the light bulb.

In some cases, as mentioned, the terminals 30 and 31 are connected directly to the contacts 27, respectively, as illustrated in FIG. 9. In such case, all that is necessary is to omit resistors 35 and 38.

Figure 13:
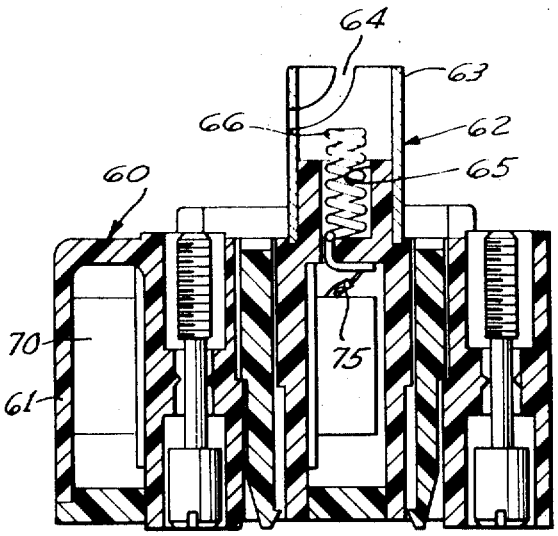
FIG. 13 is a vertical sectional view of the module shown in FIGS. 10–12 and is taken on the line 13—13 in FIGS. 11 and 12.
Figure 11:
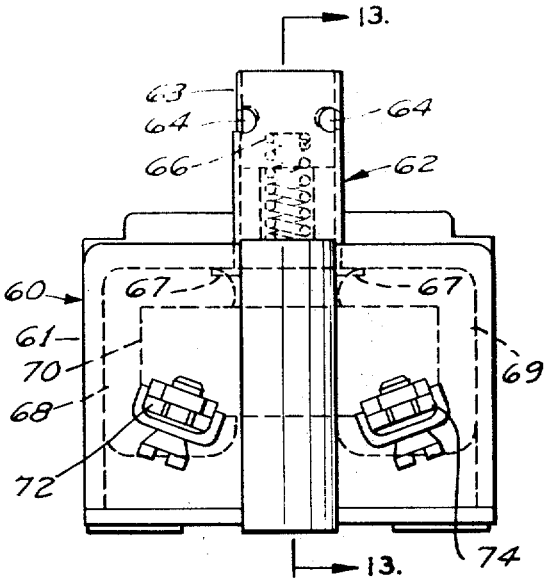
FIG. 11 is a right side elevation of the module shown in FIG. 10.
Figure 12:
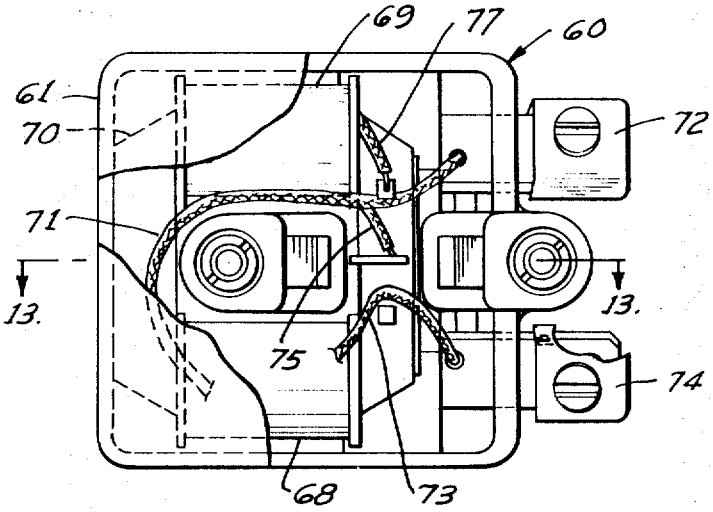
FIG. 12 is a bottom plan view of the module shown in FIGS. 10 and 11.

Again, as mentioned, sometimes a transformer is interposed between the external terminals of the module and the contacts for the light. For example, in FIGS. 12 and 13, the module 60 has a body 61, the same in form and function as the body 15 heretofore described. In this form, however, the neck 62 is somewhat shorter than in the forms heretofore described. Its outer end carries a metal ferrule 63 having the usual bayonet slot 64 for effecting a bayonet connection with the shank of a filament type light bulb. The body 60 has a bore 65, within the ferrule 63, in which is a spring conductor 66 adapted to engage the central contact on the shank of the bulb. The ferrule 63 has securing fingers 67 at its inner end which are bent over at the inside of the body 61 so as to secure the ferrule against withdrawal out forwardly therefrom. The spring conductor 66 is connected with one of its ends exposed within the body for connection to one terminal of the secondary of a transformer. One of the fingers 67 of the ferrule 63 is exposed within the body for connection to the other terminal of the secondary. Mounted within the body 60 is a transformer comprising a primary coil 68 and a secondary coil 69, the same being mounted on an O-shaped iron core 70. The conductor 71 connects one terminal of the primary to one external terminal 72 of the module. The other terminal 73 of the primary is connected to the other external terminal 74 of the module. A terminal 75 of the secondary is connected to the spring conductor 66, and the other terminal 77 of the secondary is connected to the finger 67 of the ferrule, thus providing secondary circuit for the socket through the light bulb. The exact type of transformer, resistor, and the like that may be used depend upon the particular voltage being handled by the switch and the voltage which is required for the bulb. The external terminals of the module are generally connected to a selected set of terminals on one of the switches, depending upon the type and purpose of illumination required.

The module may be placed between the operator and a pair of contact blocks, as mentioned, and any number of contact blocks can be arranged end to end as described in the above-entitled copending application.

Having thus described our invention, we claim:

1. A light module comprising a body having a front end and a rear end, a light bulb socket on the front end of the body and including contacts for connection to a light bulb, said body being a hollow housing with the cavity thereof open through the rear end of the housing and a detachable cover on the rear end of the housing and closing said open end of the cavity, said housing having a passage extending therethrough from said front end to the rear end, and said cover having a passage aligned with said passage in the housing.

an actuating pin in, and movable endwise of, the passage, said front end of the body being arranged for connection to a push button operator, having an actuator, with the actuator aligned with the pin and socket, and having a window at its forward end, and operable to engage and move the pin endwise in said passage by operation of the actuator the body being arranged for connection to a push button switch disposed at the rear of the cover with the push button extending part way into said passages and aligned with, and engageable by, the pin for endwise movement thereby, and means for connecting the contacts of the socket to a source of power.

2. A structure according to claim 1 wherein the pin is relatively stiff, but resiliently deflectable and self-restoring transversely of its length, complementary shoulder means are provided on the body in said passage, and on the pin for constraining the pin from removal endwise from the passage, the pin and the passage wall being shaped to cause said transverse deflection of the rear end portion of the pin by the passage wall upon partial insertion of the pin into the passage, from the front end of the body, rear end foremost so that the complementary shoulder means can pass each other during said partial insertion, and shaped to permit self-restoration of the pin after the complementary shoulder means have passed each other to cause the complementary shoulder means to face each other in alignment for limiting movement of the pin a predetermined distance from fully inserted position toward said partially inserted position.

3. A structure according to claim 1 wherein external terminal elements are provided for the contacts of the socket, respectively, each element has an inner portion and outer portion, said body has spaced passages in one wall leading from the exterior of the body into the interior thereof and fitting the cross-section of the inner portions of the elements, respectively, the terminal elements are insertable endwise, inner portions foremost, through the passages, respectively, and have their outer portions disposed exteriorly of the body, for attachment to a power source, when the inner ends are fully inserted, conductors are provided for the elements, respectively, in the body, the inner end portion of each element has an aperture which is disposed inwardly of said wall of the body when the element is fully inserted and which extends in a direction transversely of the associated passage, terminal pins are mounted on the ends of the conductors, respectively, and are received in the apertures of their associated elements endwise of the apertures, and are snugly accommodated therein so as to make electrical contact therewith and constrain the associated elements from withdrawal outwardly through their associated passages.

4. A structure according to claim 1 wherein the body has parallel passages therethrough spaced laterally from each other and has a cavity opening through the rear end of the body, a cover is disposed on the rear end and closes the open side of the cavity, nuts are carried by the cover and exposed at the front and rear faces thereof, bolts extend through the body from the front end and at their rear ends are in threaded engagement with the nuts for securing the cover to the body, and terminate at their rear ends in spaced relation to the rear end portions of the nuts, respectively, whereby said nuts can receive the threaded shanks of bolts from the rear of the cover for securing switch means to the body.

5. A structure according to claim 4 wherein parallel bolt accommodating passages extend through the body from front to rear, bolts having externally threaded shanks at one end and internally threaded heads at the other are disposed in said passages for securing the body to an operator at the forward end of the body by threaded engagement of the shanks with the operator and for receiving the externally threaded shanks of securing bolts in the heads for securing switch means to the body at the rear end of the body.

[6. An assembly including a light module, a push button operator, and a push button switch, and comprising a module including a body having a front end and a rear end and a light socket at the front end, an operator mounted on said front end of the body, and switch means mounted on the rear end of the body, said body having a passage extending therethrough from front to rear, a pin in said passage and movable endwise thereof and engageable at its forward end by the operator for movement endwise of the passage by the operator, and means on the switch engageable with the rear end of the pin for movement thereby when the pin is moved by the operator.]

[7. A structure according to claim 6 wherein said body as a pair of parallel laterally spaced bolt accommodating assages extending therethrough from front to rear:

bolts in said passages having externally threaded shanks at their forward ends in threaded engagement with the operator and having internally threaded heads at their rear ends, and additional bolts having externally threaded shanks at their forward ends in threaded engagement with the internally threaded heads and connecting the switch means to the rear of the body.]

[8. A structure according to claim 7 wherein said body as a cavity opening through the rear end of the body, a etachable cover is disposed on the rear end of the body, nternally threaded bushings are carried by the cover and paced from said bolt accommodating passages of the ody:

connecting bolts extend through the body from front to rear and have threaded shanks at their rear ends in threaded engagement with the bushings, respectively, and holds the cover on the body, said connecting bolts terminate in spaced relation to the rear ends of the bushings, and additional bolts are carried by the switch and having externally threaded shanks at their forward ends received in the rear ends of the bushings in threaded engagement therewith.]

9. A structure according to claim [7] *12* wherein said olt accommodating passages and said bushings are spaced part from each other circumferentially about the fore nd aft axis of the socket.

[10. A structure according to claim 6 wherein said ody has an additional passage spaced from and parallel o the first passage and extending through the body from ront to rear, another pin is arranged in said second passage and is movable endwise thereof and also is engaged at its forward end by the operator for movement endwise of its passage by the operator; and said switch means comprise two switch blocks arranged side by side and each having a push button, and said push buttons are engageable with the rear ends of the pins, respectively, each for movement by its respective pin when its respective pin is moved by the operator.]

*11. An assembly including a light module, a push button operator and a push button switch means, ana comprising a module including a body having a front end and a rear end and a light socket at the front end, an operator mounted on said front end of the body and switch means mounted on the rear end of the body, said body having a pair of parallel laterally spaced pin accommodating passages coextensive in length with the body extending therethrough from the front end to the rear end of the body, pins in said passages and movable endwise thereof and engageable at their forward ends by the operator for movement endwise in the passages by the operator, a pair of laterally spaced bolt accommodating passages coextensive in length with the body and extending therethrough from the front end to the rear end of the body, bolts in said bolt accommodating passages having externally threaded shanks at their forward ends in threaded engagement with the operator and having internally threaded heads at their rear ends, said switch means comprising two switch blocks arranged side by side and each having a push button engageable with the rear ends of the pins, respectively, each for movement by its respective pin when its respective pin is moved by the operator and an additional pair of bolts having externally threaded shanks at their forward ends respectively in threaded engagement with the internally threaded heads and connecting the switch means to the rear of the body.*

*12. A structure according to claim 11 wherein said body has a cavity opening through the rear end of the body, a detachable cover is disposed on the rear end of the body, internally threaded bushings are carried by the cover and spaced from said bolt accommodating passages of the body: connecting bolts extend through the body from front to rear and have threaded shanks at their rear ends in threaded engagement with the bushings, respectively, and holds the cover on the body, said connecting bolts terminate in spaced relation to the rear ends of the bushings, and additional bolts are carried by the switch means and having externally threaded shanks at their forward ends received in the rear ends of the bushings in threaded engagement therewith for mounting the pair of switches on the rear end of the module.*

References Cited

The following references, cited by the Examiner, are of record in the patented file of this patent or the original patent.

UNITED STATES PATENTS

| | | | |
|---|---|---|---|
| Re. 26,936 | 8/1970 | Waldorf | 200—167A |
| 2,692,973 | 10/1954 | Asaff | 200—172 |
| 3,231,706 | 1/1966 | Waldorf | 200—167 |
| 3,244,935 | 4/1966 | Robbins et al. | 200—167 |

HERMAN O. JONES, Primary Examiner